3,080,293
PROCESS OF MAKING PLEASANT-TASTING NIACINAMIDE BEADLETS

Arnold Koff, West Orange, N.J., assignor to Hoffmann-La Roche Inc., Nutley, N.J., a corporation of New Jersey
No Drawing. Filed Aug. 2, 1960, Ser. No. 46,888
3 Claims. (Cl. 167—81)

This invention relates to a new atricle of manufacture and sale, more especially a new article of manufacture in the pharmaceutical field. Broadly characterized, the novel product of the invention can be described as niacinamide (nicotinamide) in the form of free-flowing, pleasant-tasting stable beadlets.

Niacinamide has been dispensed for many years in multivitamin dosage forms, more particularly in liquid formulations and in gelatin capsules. More recently, there has been a demand for multivitamin chewable tablets containing niacinamide. However, the previously known forms of niaciniamide have not been readily employable in chewable tablets, because of undesirable taste characteristics, and poor stability as evidenced especially by the development of off-taste.

It is an object of the present invention to provide niacinamide in a form having improved taste characteristics, useful preeminently for the manufacture of chewable multivitamin tablets, but useful also for other pharmaceutical products and for the preparation of vitamin-enriched foods. Accordingly, the end products of the invention are intended to be suitable (among other uses) as articles of commerce, for sale to pharmaceutical and food manufacturers.

The present invention provides processes for manufacturing niacinamide in the form of free-flowing, pleasant-tasting powders useful for the above purposes. More particularly, the invention provides processes which comprise forming a melt containing niacinamide uniformly distributed in a molten medium comprising essentially material selected from the group consisting of naturally occurring saturated fatty acids having from sixteen to eighteen carbon atoms; atomizing said melt into discrete liquid droplets having a diameter of from about 30 microns to about 600 microns (preferably, from about 60 microns to about 250 microns); rapidly air-cooling said droplets into congealed state; and ageing the resulting beadlets.

Mixtures of naturally occurring saturated fatty acids having from sixteen to eighteen carbon atoms are available commercially, and such commercially available materials are suitable for purposes of the invention. One such material is that sold in commerce under the designation "triple pressed stearic acid." Notwithstanding its name, the last mentioned material is essentially a mixture of stearic acid and palmitic acid. Of course either palmitic acid alone or stearic acid alone can also be employed as the coating material in the processes of the invention, but the use of such single acids is ordinarily not desirable for economic reasons.

In carrying out the processes of the invention, a first step comprises forming a melt of the acid or mixture of acids to be employed as the coating material, and uniformly dispersing therein the niacinamide. Conveniently, this step is effected in a melting tank wherein the acid or acids mixture is raised to a temperature several degrees (e.g. 5° C.) above its melting point, and then the finely divided niacinamide is dispersed therein, with good agitation to produce homogeneous distribution, the temperature of the melting tank being kept sufficiently high to maintain the acid(s)-niacinamide mixture in a fluid state. The melt is then transferred to a convetnional spray-chilling tower or chamber, wherein the molten material is atomized into droplets, which are then quickly chilled by blowing cool (about 20° C.) air through the tower. Any convenient atomizing device (such as a two-fluid nozzle or a high-speed centrifugal atomizing wheel) can be employed, under conditions that will give discrete droplets of the melt having a size in the above indicated ranges. The solidified or congealed droplets fall to the bottom of the tower, where they are collected.

An important teaching of the present invention is the provision of an ageing step in the preparation of the niacinamide beadlets. It has been found that freshly prepared beadlets exhibit an unpleasant bitter taste; but surprisingly, this taste disappears in time if the beadlets formed by the spray-chilling operation are allowed to stand before being used, e.g. before being compounded into chewable multivitamin tablets. The required period of ageing varies with the ambient conditions; for example, it has been found that the higher the temperature, the shorter the storage time required to complete the transformations accomplished by the ageing procedure. Completion of ageing is determined empirically, by tasting an aliquot from each batch; the step is complete when the bitter taste is no longer noted upon testing the aliquot. In general, and as a practical guide, it has been found convenient to effect the ageing step by keeping the beadlets at 45° (e.g., in a drying oven) for two weeks after the spray-chilling step. An alternative procedure is to spread the beadlets in drying trays and keep them in a dry atmosphere at room temperature, until bitter taste is no longer noted on test. It is thought that, during the ageing step, the acid or acids-mixture employed as the coating material undergoes a change from a metastable to a stable crystalline form; but the invention is not to be limited by this theory.

In order to improve the free-flowing quality of the powders produced by the processes of the invention it is often desirable to incorporate silicic acid in the formulation, as a dusting powder to be applied to the beadlets at a point in the process after the spray-chilling step. In general, any desired proportion of silicic acid can be employed which is deemed necessary to insure satisfactory free-flowability of product. As little as 0.5% of silicic acid (by weight of finished beadlets), and as high as 10%, has been employed; but ordinarily, 1% by weight of silicic acid affords satisfactory results. It will be appreciated that the proportion of silicic acid employed will usually be the minimum amount which results in a satisfactory, pharmaceutically elegant product; both for reasons of economy in material requirements, and also because it is often desired to have the weight proportion of active ingredient (niacinamide) in the finished product as high as possible.

Among other advantages, the invention provides pleasant-tasting beadlets, of the character above described, wherein a high concentration of niacinamide is attained; varying from about 33% by weight (of finished beadlet) to as high as 50% by weight.

In order to remove agglomerated beadlets and any other coarse material from the product, the beadlets will usually require screening at some point in the process subsequent to the spray-chilling step.

The sequence of steps subsequent to the spray-chilling step—i.e. the steps of ageing, dusting with silicic acid and screening—is not critical. Often it is convenient to dust the beadlets with silicic acid, e.g. in a twin-shell blender, prior to the screening step, and to perform the ageing step last. In other circumstances it is convenient to age the crude product from the spray-chilling step, then to dust with silicic acid, and finally to screen the dusted beadlets. Under still another set of conditions, it is sometimes convenient to combine the dusting step with an optional step of blending beadlets from different batches. Other arrangements of steps will be obvious to those skilled in the art, who will further understand that only the ageing step (of the steps described above as being performed subsequently to the spray-chilling step) is indispensable to the fundamental concept taught by the invention.

The invention is further disclosed in the following examples which are illustrative but not limitative thereof.

*Example 1*

650 g. of stearic acid U.S.P. triple pressed is charged to a melting vessel and heated, while stirring, to a temperature of 60° C. 340 g. of finely divided niacinamide is then mixed into the tank while stirring, and the resulting suspension is stirred for 30 minutes to assure uniform dispersal, the temperature of the melt being meanwhile gradually raised to 85° C. The melt at the latter temperature is then transferred to a centrifugal atomizer rotating at 12,500 r.p.m., the molten material being fed at the rate of 25 gallons per hour. Air at a temperature of 20° C. is blown through the spray tower. The chilled droplets fall to the bottom of the tower. Any beadlets that are carried over in the effluent air stream are collected in a cyclone separator. The beadlets at the bottom of the tower and in the cyclone separator are collected.

The collected beadlets are kept in a drying oven at 45° C. for fourteen days, at the end of which time they are free of bitter taste. The aged beadlets are transferred to a twin-shell blender, 10 g. of silicic acid is added, and the mixture is blended until the beadlets are uniformly dusted with the silicic acid. The dusted material is then screened through a 25 mesh screen.

The finished product is niacinamide in the form of free-flowing, pleasant-tasting beadlets having a diameter of about 60 microns.

*Example 2*

1950 g. of stearic acid U.S.P. triple pressed is charged to a melting vessel and heated while stirring to a temperature of 65° C. 1000 g. of finely divided niacinamide is then mixed into the tank while stirring, and the resulting suspension is stirred for 30 minutes to assure uniform dispersal, the temperature of the melt being meanwhile gradually raised to 86° C. The melt at the latter temperature is then transferred to a centrifugal atomizing wheel rotated at 12,500 r.p.m., the molten material being fed at the rate of 25 gallons per hour. Air at a temperature of 20° C. is blown through the spray tower. The chilled droplets fall to the bottom of the tower. Any beadlets that are carried over in the effluent air stream are collected in a cyclone separator.

The beadlets are all collected and screened through a 25 mesh screen. Then they are dusted with 50 g. of silicic acid.

A small portion of the batch is spread out on trays to age at room temperature (about 25° C.). The remainder is aged at 45° C. in a drying oven, as in Example 1.

Both portions furnish niacinamide in the form of pleasant-tasting, free-flowing beadlets having a diameter of about 60 microns. However, the ageing period for the tray-dried product is considerably longer than for the oven-dried product.

I claim:

1. A process of making an article of manufacture which comprises forming a melt containing niacinamide uniformly distributed in a molten medium comprising essentially material selected from the group consisting of naturally occurring saturated fatty acids having from sixteen to eighteen carbon atoms; atomizing said melt into discrete liquid droplets having a diameter of from about 30 microns to about 600 microns; rapidly air-cooling said droplets into congealed state; and ageing the resulting beadlets for at least about fourteen days at a temperature ranging from about room temperature to about 45° C.; said ageing being carried out without incorporating the beadlets into any other pharmaceutical formulations.

2. A process of making an article of manufacture which comprises forming a melt containing niacinamide uniformly distributed in a molten medium comprising essentially a mixture of naturally occurring saturated fatty acids having from sixteen to eighteen carbon atoms; atomizing said melt into discrete liquid droplets having a diameter of from about 60 microns to about 250 microns; rapidly air-cooling said droplets into congealed state; and ageing the resulting beadlets for at least about fourteen days at a temperature ranging from about room temperature to about 45° C.; said ageing being carried out without incorporating the beadlets into any other pharmaceutical formulations.

3. A process of making an article of manufacture which comprises forming a melt containing niacinamide uniformly distributed in a molten medium comprising essentially material selected from the group consisting of naturally occuring saturated fatty acids having from sixteen to eighteen carbon atoms; atomizing said melt into discrete liquid droplets having a diameter of from about 30 microns to about 600 microns; rapidly air-cooling said droplets into congealed state; and ageing the resulting beadlets for at least about fourteen days at a temperature of about 45° C.; said ageing being carried out without incorporating the beadlets into any other pharmaceutical formulations.

References Cited in the file of this patent

UNITED STATES PATENTS

| | | |
|---|---|---|
| 2,709,149 | Dunmire | May 24, 1955 |
| 2,777,797 | Hochberg et al. | Jan. 15, 1957 |
| 2,796,380 | Maietta | June 18, 1957 |
| 2,816,854 | Gross | Dec. 17, 1957 |
| 2,832,720 | Bacher et al. | Apr. 29, 1958 |
| 3,037,911 | Stoyle et al. | June 5, 1962 |

FOREIGN PATENTS

| | | |
|---|---|---|
| 285,091 | Great Britain | June 10, 1929 |
| 1,078,283 | Germany | Mar. 24, 1960 |

OTHER REFERENCES

The Merck Index, 6th ed., pub. by Merck & Co., Inc., Rahway, New Jersey, page 903.